US011118457B2

(12) United States Patent
Ivakitch et al.

(10) Patent No.: US 11,118,457 B2
(45) Date of Patent: Sep. 14, 2021

(54) METHOD FOR FAN BLADE HEATING USING COANDA EFFECT

(71) Applicant: PRATT & WHITNEY CANADA CORP., Longueuil (CA)

(72) Inventors: Richard Ivakitch, Scarborough (CA); David Menheere, Norval (CA); Paul Stone, Guelph (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 32 days.

(21) Appl. No.: 16/658,381

(22) Filed: Oct. 21, 2019

(65) Prior Publication Data

US 2021/0115795 A1    Apr. 22, 2021

(51) Int. Cl.
*F01D 5/08* (2006.01)
*F04D 29/58* (2006.01)

(52) U.S. Cl.
CPC .............. *F01D 5/08* (2013.01); *F04D 29/58* (2013.01); *F05D 2220/32* (2013.01); *F05D 2260/22141* (2013.01)

(58) Field of Classification Search
CPC . F01D 5/08; F01D 25/02; F04D 29/58; F05C 2220/32; F05C 2260/22141; F02C 7/047
See application file for complete search history.

(56) References Cited

U.S. PATENT DOCUMENTS

| 2,630,965 | A | * | 3/1953 | Greatrex | F02C 7/047 |
| | | | | | 415/115 |
| 4,863,354 | A | * | 9/1989 | Asselin | B64C 11/14 |
| | | | | | 416/245 R |
| 5,197,855 | A | * | 3/1993 | Magliozzi | B64C 11/00 |
| | | | | | 415/119 |
| 6,125,626 | A | * | 10/2000 | El-Aini | F01D 5/10 |
| | | | | | 60/226.1 |
| 9,387,923 | B2 | | 7/2016 | Stretton et al. | |
| 9,828,914 | B2 | | 11/2017 | Suciu et al. | |
| 10,113,444 | B2 | * | 10/2018 | Huang | F01D 9/065 |
| 10,323,571 | B2 | * | 6/2019 | Subramanian | F02C 7/047 |
| 10,711,797 | B2 | * | 7/2020 | Kroger | F04D 29/545 |
| 10,724,435 | B2 | * | 7/2020 | Kroger | F04D 29/684 |
| 10,738,650 | B2 | * | 8/2020 | Scholtes | F01D 25/02 |
| 10,822,999 | B2 | * | 11/2020 | Morris | F01D 5/28 |
| 10,883,380 | B2 | * | 1/2021 | Roberge | G10K 9/18 |
| 2014/0199176 | A1 | * | 7/2014 | Tomeo | F01D 5/025 |
| | | | | | 416/245 R |
| 2015/0345327 | A1 | * | 12/2015 | Huang | F01D 25/12 |
| | | | | | 415/115 |
| 2016/0312799 | A1 | * | 10/2016 | Yu | F04D 29/542 |
| 2018/0066536 | A1 | * | 3/2018 | Scholtes | F02C 7/047 |
| 2018/0087456 | A1 | | 3/2018 | Alecu et al. | |
| 2019/0024533 | A1 | * | 1/2019 | Scholtes | F02C 7/047 |
| 2020/0386118 | A1 | * | 12/2020 | Warren | B64D 15/00 |

FOREIGN PATENT DOCUMENTS

GB           2038425           * 12/1978

* cited by examiner

*Primary Examiner* — Jesse S Bogue
(74) *Attorney, Agent, or Firm* — Norton Rose Fulbright Canada LLP

(57) ABSTRACT

A method of heating a fan blade of a gas turbine engine for anti-icing includes emitting jets of heated air from a radial fin disposed upstream from a radially inward portion of a fan blade airfoil, the jets of heated air being directed by outlet orifices in a downstream direction substantially parallel to a flow of incoming air over the fan blade airfoil.

19 Claims, 3 Drawing Sheets

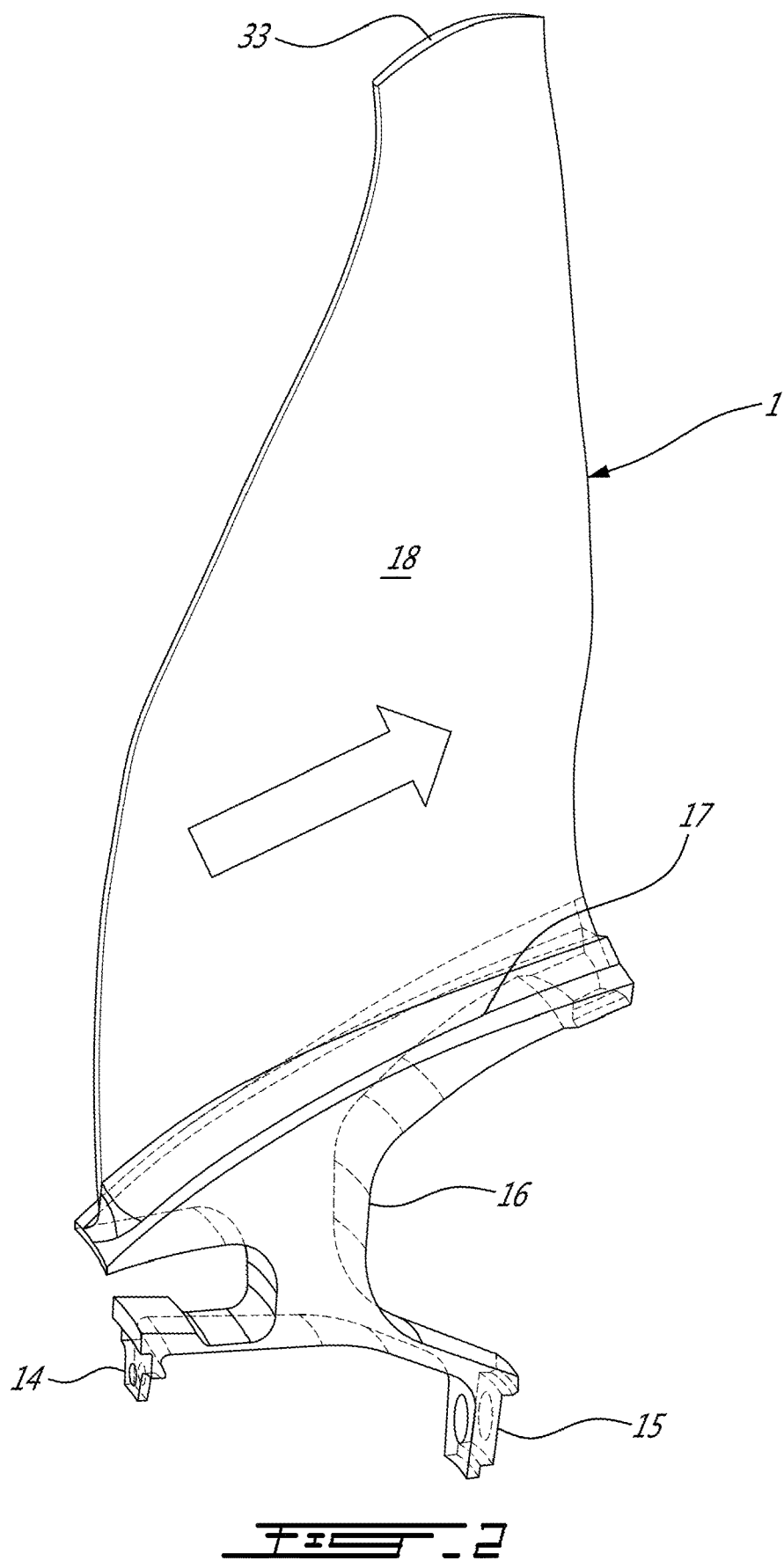

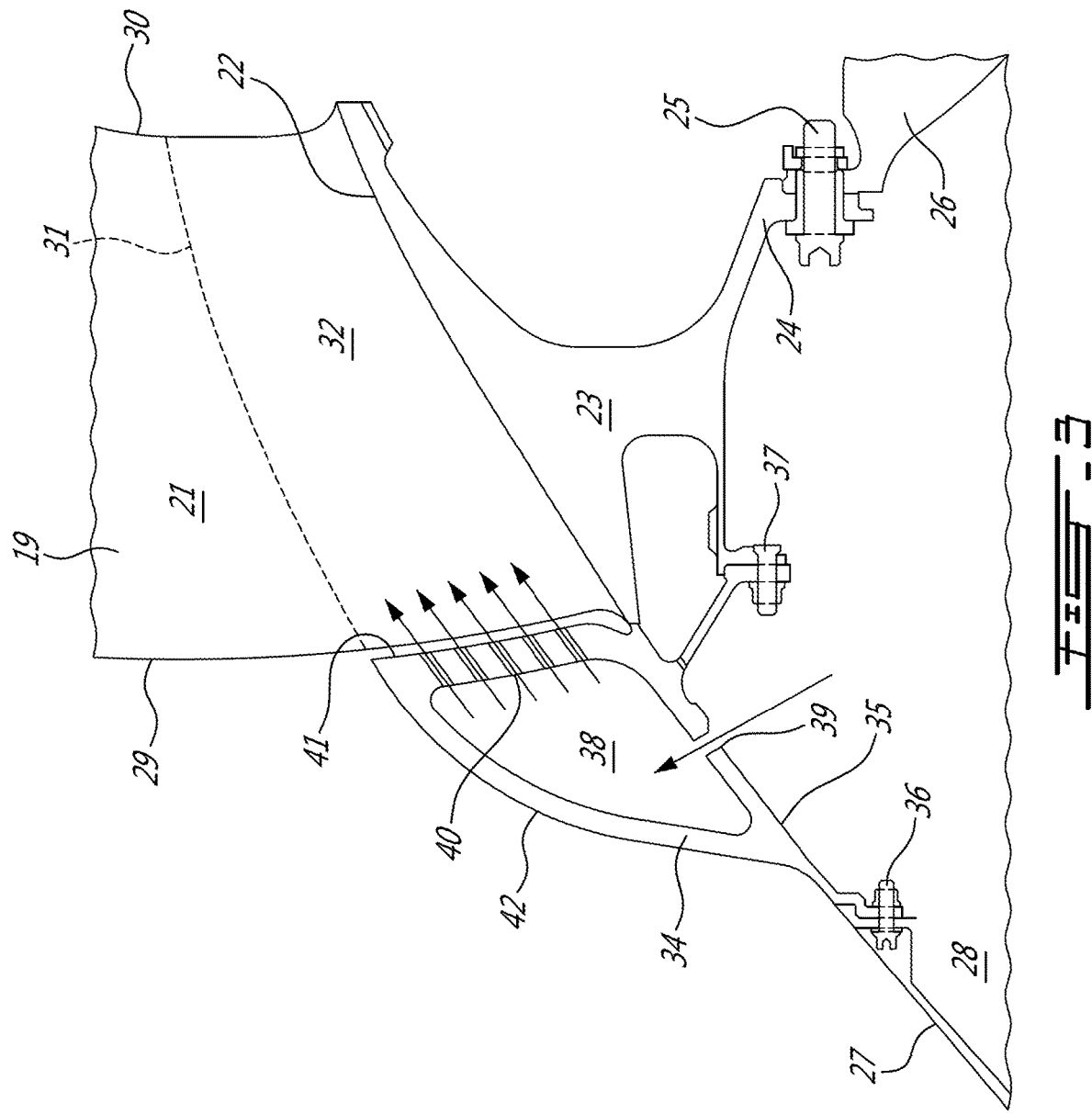

METHOD FOR FAN BLADE HEATING USING COANDA EFFECT

TECHNICAL FIELD

The disclosure relates generally to fans for turbofan gas turbine engines, and to anti-icing of the fan blades in a gas turbine engine.

BACKGROUND

Ice can form and adhere to the fan blades of a gas turbine engine under certain conditions during flight. The weight of the ice buildup can result in imbalance of the fan and can be detrimental to efficient air flow. When ice deposits break away and are released from the blades, the fan can be imbalanced, orbiting may increase, vibration may occur and/or impact from ice particles can cause foreign object damage to the engine.

Various anti-icing devices have been developed such as electrical heaters in surfaces prone to icing or effusion of hot air into the air flow passing over the airfoil of a blade. Hot air can quickly mix with the turbulent incoming air flow into the engine and the anti-icing effect can be dissipated. Improvement is desirable.

SUMMARY

There is accordingly provided a rotor of a gas turbine engine comprising: a hub and a plurality of blades extending from the hub; and an anti-icing fin attached to the hub and extending radially therefrom upstream of at least one blade of the plurality of blades, the anti-icing fin including: a fin body having an airfoil shape and disposed upstream from a radially inward portion of the at least one blade; a plenum defined within the fin body in communication with a heated air source of the gas turbine engine; and a plurality of outlet orifices oriented in a downstream direction substantially parallel to a flow of incoming air over the at least one blade.

There is also provided a method of heating a fan blade of a gas turbine engine for anti-icing, the method comprising: emitting jets of heated air from a radial fin disposed upstream from a radially inward portion of a fan blade airfoil, the jets of heated air being directed by outlet orifices in a downstream direction substantially parallel to a flow of incoming air over the fan blade airfoil.

There is further provided a gas turbine engine comprising: an engine nose cone having a chamber in communication with a heated air source of the gas turbine engine; a fan having a fan hub and a circumferentially spaced apart plurality of fan blades, each fan blade having an airfoil with a leading edge and a radially inward portion of the fan blade airfoil; a circumferentially spaced apart plurality of anti-icing radial fins disposed on an annular ring, the annular ring being disposed between the engine nose cone and an associated blade being one of the plurality of fan blades, wherein each fin has a plenum in communication with the chamber and a plurality of outlet orifices oriented in a downstream direction substantially parallel to a flow of incoming air over the radially inward portion of the associated blade.

There are provided structures and/or methods for preventing ice accumulation on the fan blades of a gas turbine engine. In one embodiment, this is achieved using airfoil shaped fins upstream of a rotor, the airfoil shaped "shark fin" configured to convey heated air from the hub onto the rotor, and therefore the fan blades, to reduce or prevent ice formation on the main fan blades.

Further details of these and other aspects of the subject matter of this application will be apparent from the detailed description included below and the drawings.

BRIEF DESCRIPTION OF THE DRAWINGS

FIG. 2 is an isometric transparent detail view of an individual fan blade with a base, airfoil and platform.

FIG. 3 is a partial axial cross-sectional view through a fan blade including a nose cone with an upstream fin having heated air outlets to create a boundary layer air film (Coanda effect) to impede icing of the airfoil adjacent the blade platform.

DETAILED DESCRIPTION

Figure 1:
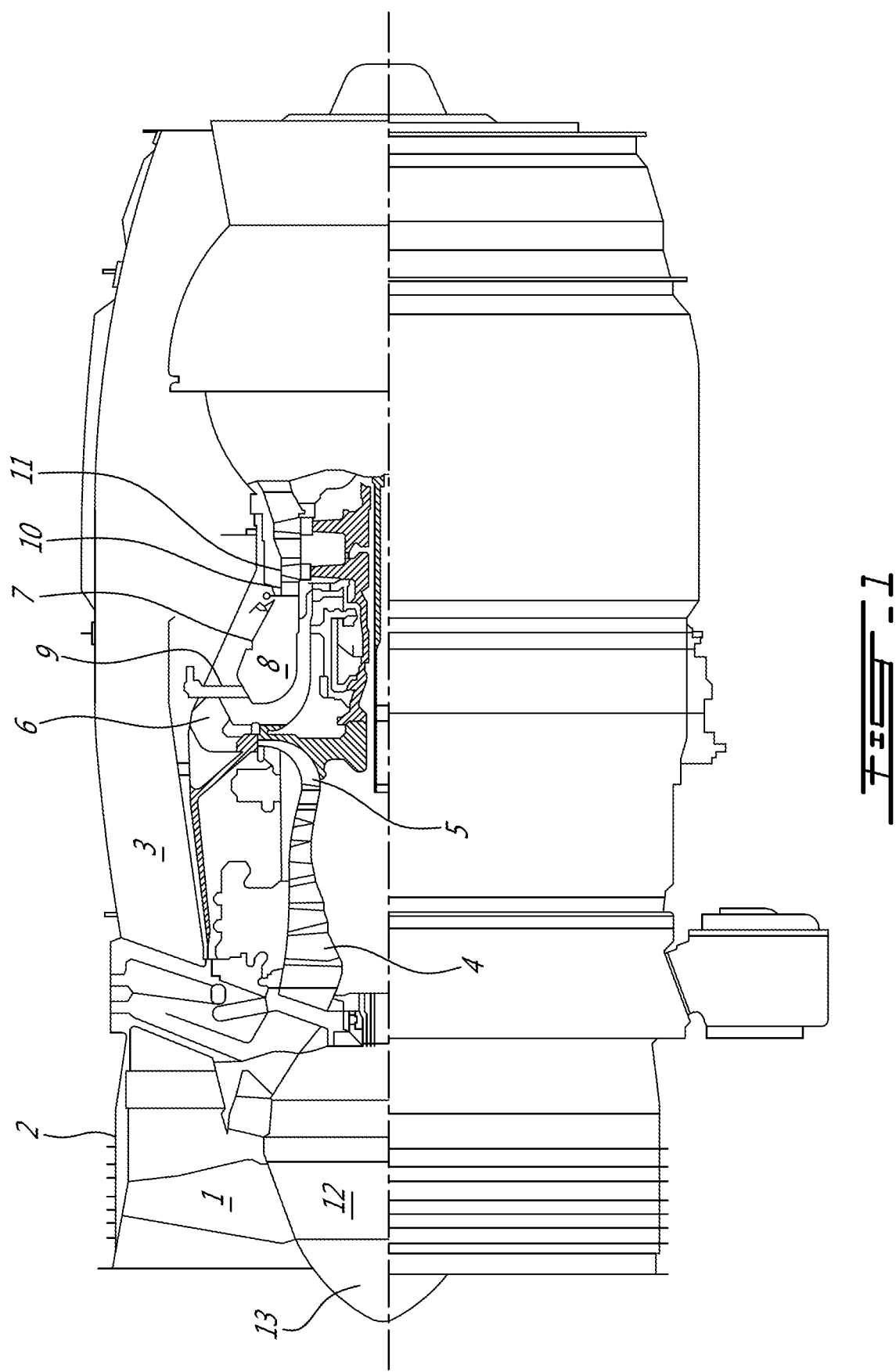
FIG. 1 shows an axial cross-section view of a turbo-fan gas turbine engine.

FIG. 1 shows an axial cross-section through an aircraft engine. According to the illustrated embodiment, the aircraft engine is a turbo-fan gas turbine engine. However, it is understood that the aircraft engine could adopt various other forms. For instance, it could be a turboshaft, a turboprop or even a compounded engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

The present description and drawings relate to anti-icing features of the fan 1. The compressors 4, 5 and combustor 8 create heated air having a temperature and pressure greater than ambient and at least above the freezing temperature of water at flight altitude. Heated pressurized air can originate from the compressors 4, 5 or combustor 8 and be bled off to be directed through the engine to the engine nose cone 13 via ducts within the hollow central engine shafts, for example.

With reference to FIG. 2, an individual fan blade 1 is shown removed from the fan case 2. Each fan blade 1 forms part of a circumferential array of like fan blades 1 mounted to the cylindrical fan hub with bolts through the rear mounting tab 15 at the blade base 16. The blade base 16 is mounted to the engine nose cone 13 with bolts through the front mounting tab 14. The fan blade 1 includes a blade platform 17 that directs the incoming air flow to define a path that engages the airfoil 18. The incoming air flow is indicated with an arrow in FIG. 2 and in certain conditions the air flow deposits ice on radially inward portions of the airfoil 18 and on the platform 17.

FIG. 3 shows an axial cross-section of a fan blade 19 with an upstream fin 34 for anti-icing in accordance with the present description. As in the above description of FIGS. 1 and 2, the fan blade 19 of FIG. 3 includes an airfoil 21 and blade platform 22 that engage and direct the incoming air flow (see arrow) into the engine. The blade base 23 has a rear mounting tab 24 connected with a bolt 25 to the fan hub 26.

In FIG. 3 the engine nose cone 27 has an internal chamber 28 in communication with a heated air source of the gas turbine engine (such as the compressors 4, 5 and combustor 8 shown in FIG. 1). For example, the quantity of heated pressurized air required is relatively low and can be ducted through the hollow central engine shafts to the internal chamber 28 of the nose cone 27. The fan hub 26 supports a circumferentially spaced apart array of identical fan blades 19. FIG. 3 shows a single fan blade 19 for clarity and it will be understood that the same arrangement is repeated about the circumferences of the fan hub 26 and the engine nose cone 27.

Each fan blade 19 has an airfoil 21 with a leading edge 29 and a trailing edge 30. A dashed line 31 in FIG. 3 and the blade platform 22 form boundaries of a radially inward portion 32 of the fan blade airfoil 21. For example, the radially inward portion 32 may be one third of the radial length of the blade airfoil 21 measured between the blade platform 22 and blade tip (33—see FIG. 2).

In FIG. 3, between the engine nose cone 27 and the blade base 23 is a circumferentially spaced apart plurality of anti-icing radial fins 34 disposed on an annular ring 35. The annular ring 35 is secured to the engine nose cone 27 with forward bolts 36 and to the circumferential array of multiple fan blades 19 with rearward bolts 37. The annular ring 35 supports one anti-icing radial fin 34 upstream from each of the multiple fan blades 19 so that the engine nose cone 27, annular ring 35 with fins 34, fan hub 26 and fan blades 19 rotate together on an engine shaft.

Each fin 34 has a plenum 38 that is in fluid communication with the chamber 28 of the engine nose cone 27 and receives heated pressurized air via multiple inlet orifices 39. The fins 34 have one or more outlet orifices 40 on a trailing edge 41. The outlet orifices 40 can be drilled to any desired angular orientation emit jets of heated air toward the leading edge 29 of the airfoil 21, toward only the pressure side of the fan blade airfoil 21, toward only the suction side of the fan blade airfoil 21, or to both sides simultaneously. In all cases, the outlet orifices 40 are oriented in a downstream direction substantially parallel to the flow of incoming air over the radially inward portion 32 of the associated fan blade 19. As a result, the heated air jets emitted from the outlet orifices 40 merge or exit at an acute angle to the incoming airflow direction to create a boundary layer flow (i.e. the Coanda effect). The outlet orifices 40 can be located and oriented to various areas on the surface of the airfoil 21 and platform 22 that are prone to icing, which in general are located in the radially inward portion 32.

To recap the above description, an anti-icing radial fin 34 is located upstream from each fan blade 19 for heating the fan blade airfoil 21 of a gas turbine engine. The fins 34 can be supported on an annular ring 35 disposed between the engine nose cone 27 and the blade platform 22. Alternatively the fins 34 could be formed on the engine nose cone 27 as a combined element. The fin 34 has an aerodynamically shaped body with a trailing edge 41 disposed upstream from the radially inward portion 32 of the fan blade airfoil 21. The fin 34 has a plenum 38 that is in communication with a heated air source of the gas turbine engine via the internal chamber 28 of the engine nose cone 27 or through some other ducting initiating from a heated air source such as a compressor 4, 5 or combustor 8.

The fin 34 has one or more outlet orifices 40 oriented in a downstream direction substantially parallel to a flow of incoming air over the fan blade airfoil 21. In the example illustrated multiple outlet orifices 40 are disposed upstream from the leading edge 29 of the fan blade airfoil 21. FIG. 3 shows an axial gap between the trailing edge 41 of the fin 34 and the leading edge 29 of the airfoil 21. However the trailing edge 41 of the fin could extend axially rearward of the leading edge 29 of the airfoil 21 on either the suction side or the pressure side depending on icing conditions, aerodynamics or structural considerations. The multiple outlet orifices 40 can be directed toward the leading edge 29 or pressure side or suction side of the fan blade airfoil 21. In the example shown, the outlet orifices 40 are radially spaced apart by a uniform distance along the trailing edge 41 of the body of the fin 34 upstream and parallel to the leading edge 29 of the fan blade airfoil 21. Alternatively, the spacing between outlet orifices 40 and angular orientation can vary along the trailing edge 41 to tailor the jets of heated air to any icing condition.

In the example illustrated, the fan blade 19 has a radial length extending from the blade platform 22 to the blade tip 33. The radially inward portion 32 of the fan blade airfoil 21 spans from the blade platform 22 to approximately one third of the radial length, defining an area generally prone to icing. In the example illustrated, the body of the fin 34 has a convex leading edge 42 axially aligned with the leading edge 29 of the radially inward portion 32 of the fan blade airfoil 21. However the trailing edge 41 of the fin 34 can axially overlap or can be circumferentially offset from the leading edge 29 of the airfoil 21 if desired.

The heated air jets can be delivered from the outlet orifices 40 of the trailing edge 41 of the fin 34 to impinge on the fan blade airfoil 21 on the pressure surface, suction surface or both. The heated air jets can merge or exit the outlet orifices 40 at an acute angle to the incoming airflow direction to create a boundary layer flow, commonly referred to as the Coanda effect. Heated air can be delivered to the blade airfoil 21 or blade platform 22 location where icing most likely to accrete, usually the radially inward ⅓ of the airfoil 21. The heated air can be delivered in sufficient quantity and pressure to prevent ice formation altogether or to limit ice formation or to lower the bond strength of the ice formed on the blade 19. These functions are designed to lower the imbalance caused by ice accumulation on the blade 19 and ice shedding from the blade 19. The fin 34 can be designed to meet all FOD (foreign object damage), structural, aerodynamic and dynamic requirements for the gas turbine engine.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A rotor of a gas turbine engine comprising:
   a hub and a plurality of blades extending from the hub, the hub rotatable about an axis of rotation; and
   an anti-icing fin attached to the hub for rotation therewith, the anti-icing fin extending radially from the hub upstream of a blade of the plurality of blades to direct heated air onto the blade, there being no relative rotation between the anti-icing fin and the blade, the anti-icing fin including:
- a fin body having an airfoil shape and disposed upstream from a radially inward portion of the blade;
  - a plenum defined within the fin body in communication with a heated air source of the gas turbine engine; and
  - a plurality of outlet orifices oriented in a downstream direction substantially parallel to a flow of incoming air over the blade, wherein the outlet orifices are radially spaced apart along a trailing edge of the fin body.

2. The rotor according to claim 1, wherein the gas turbine engine is a turbofan and the rotor is a fan thereof, the plurality of blades being fan blades, and wherein the fin body is disposed between an engine nose cone and a fan blade platform of the hub to which the fan blades are engaged.

3. The rotor according to claim 1, wherein the plurality of outlet orifices are disposed upstream of a leading edge of an airfoil of the blade.

4. The rotor according to claim 1, wherein the plurality of outlet orifices are directed toward one of: a pressure side of the blade; and a suction side of the blade.

5. The rotor according to claim 1 wherein the outlet orifices are uniformly spaced apart.

6. The rotor according to claim 1, wherein the blade has a radial length extending from a blade platform to a blade tip, and wherein the radially inward portion of the blade spans from adjacent the blade platform to no more than one third of the radial length.

7. The rotor according to claim 1, wherein the fin body has a convex leading edge aligned with a leading edge of the radially inward portion of the blade.

8. The rotor according to claim 1, wherein the plenum is in fluid communication with a chamber within an engine nose cone, and wherein the chamber is in fluid communication with the heated air source of the gas turbine engine.

9. A method of heating a fan blade of a gas turbine engine for anti-icing, the method comprising:
- emitting jets of heated air from a radial fin disposed upstream from a radially inward portion of a fan blade airfoil, the radial fin and the fan blade being mounted to a common hub and rotating together, the jets of heated air being directed by outlet orifices in a downstream direction substantially parallel to a flow of incoming air over the fan blade airfoil, wherein the outlet orifices are radially spaced apart along a trailing edge of the radial fin, and wherein the jets of heated air flowing downstream from the radial fin form a boundary layer flow over the radially inward portion of the fan blade airfoil.

10. The method according to claim 9, comprising:
- bleeding the heated air from a gas turbine engine heated air source selected from the group consisting of: a combustor; a low pressure compressor; and a high pressure compressor; and
- conveying the heated air via an axial duct from the heated air source to a plenum within the radial fin,
- wherein the outlet orifices are in fluid communication with the plenum.

11. The method according to claim 10, wherein the step of conveying the heated air includes conveying the heated air from the heated air source to a chamber within an engine nose cone, and
- wherein the outlet orifices are in fluid communication with the chamber via the plenum of the radial fin.

12. The method according to claim 9, wherein the jets of heated air are emitted upstream of a leading edge of the fan blade airfoil.

13. The method according to claim 12, wherein the jets of heated air are emitted toward one of: a pressure side of the fan blade airfoil; and a suction side of the fan blade airfoil.

14. The method according to claim 12, wherein the jets of heated air are radially spaced apart along the leading edge of the fan blade airfoil.

15. The method according to claim 14, wherein the jets of heated air are uniformly spaced apart.

16. The method according to claim 9, wherein the fan blade has a radial length extending from a blade platform to a blade tip, and wherein the radially inward portion of the fan blade airfoil spans from adjacent the blade platform to no more than one third of the radial length.

17. The method according to claim 9, wherein the radial fin is disposed between the blade airfoil and an engine nose cone.

18. A gas turbine engine comprising:
- an engine nose cone having a chamber in communication with a heated air source of the gas turbine engine;
- a fan having a fan hub and a circumferentially spaced apart plurality of fan blades, each of the fan blades having an airfoil with a leading edge and a radially inward portion of the airfoil;
- a circumferentially spaced apart plurality of anti-icing radial fins disposed on an annular ring, the annular ring being disposed between the engine nose cone and the plurality of fan blades, with the anti-icing radial fins disposed in circumferential alignment with the fan blades, the annular ring mounted to the fan hub for rotation therewith, there being no relative rotation between the anti-icing radial fins and the fan blades; and
- each of the anti-icing radial fins having a plenum in communication with the chamber and a plurality of outlet orifices oriented in a downstream direction substantially parallel to a flow of incoming air over the radially inward portion of the airfoil of the fan blades, wherein the outlet orifices are radially spaced apart along trailing edges of the anti-icing radial fins.

19. The gas turbine engine according to claim 18, wherein the fan blades have a radial length extending from a blade platform to a blade tip, and wherein the radially inward portion of the airfoil of each of the fan blades spans from adjacent the blade platform to no more than one third of the radial length.

* * * * *